(No Model.)

J. E. MILLER.
TOOL FOR SHAPING GLASSWARE.

No. 575,125. Patented Jan. 12, 1897.

WITNESSES

INVENTOR
John E. Miller
by Bakewell & Bakewell
his Attorneys.

UNITED STATES PATENT OFFICE.

JOHN E. MILLER, OF WASHINGTON, PENNSYLVANIA, ASSIGNOR TO GEORGE DUNCAN'S SONS & CO., OF SAME PLACE.

TOOL FOR SHAPING GLASSWARE.

SPECIFICATION forming part of Letters Patent No. 575,125, dated January 12, 1897.

Application filed January 30, 1896. Renewed November 11, 1896. Serial No. 611,784. (No model.)

*To all whom it may concern:*

Be it known that I, JOHN E. MILLER, of Washington, in the county of Washington and State of Pennsylvania, have invented a new and useful Improvement in Tools for Shaping Glassware, of which the following is a full, clear, and exact description, reference being had to the accompanying drawings, in which—

Figure 1:
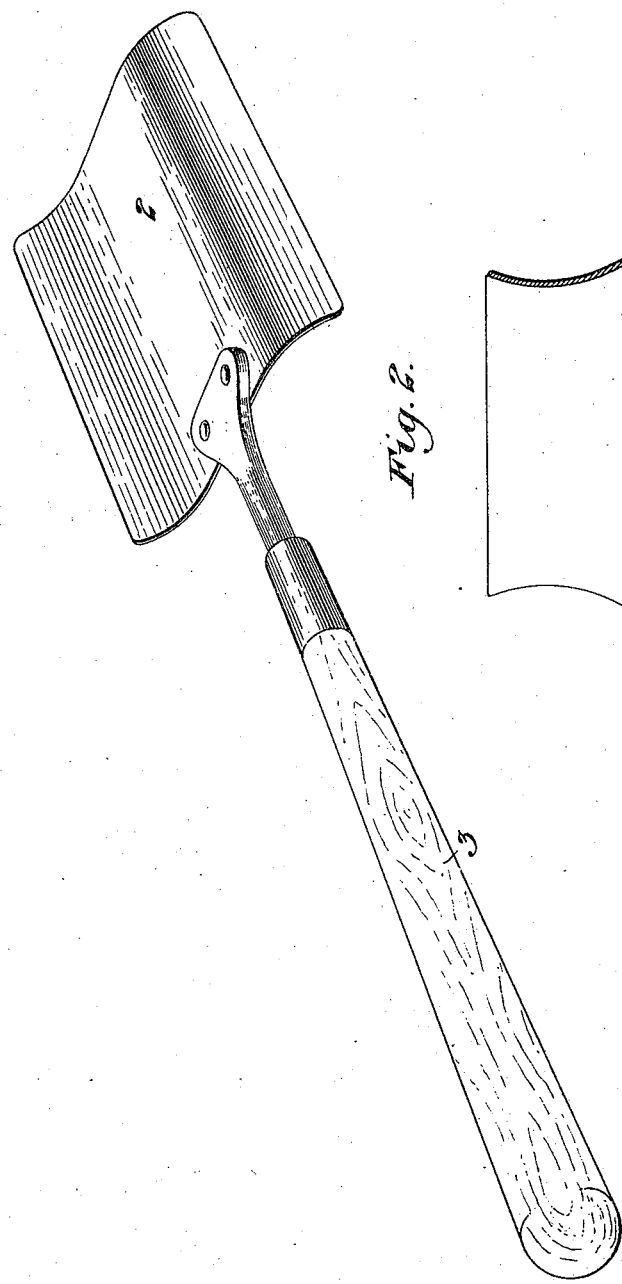
Figure 2:
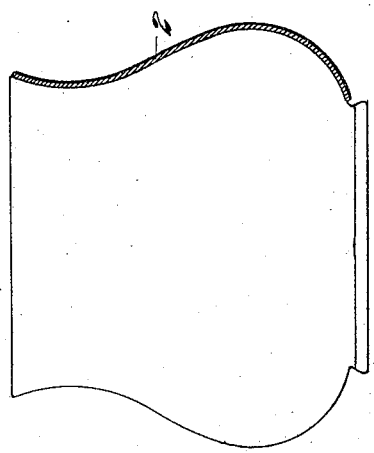

Figure 1 is a perspective view showing a tool for shaping articles of glassware constructed in accordance with my invention. Fig. 2 is a side elevation of a glass vessel shaped by use of said tool, the tool being shown in contact with the vessel in vertical section.

In the manufacture of pressed-glass vessels which are not cylindrical in shape, but which have curved sides, it has been common practice to first press the vessel in a mold which gives to it the proper size and surface-pattern, but with a cylindrical or flaring shape, and then by rotating it while hot in contact with a wooden forming-tool to draw in the sides so as to impart to them the desired contour. Such work being done by hand requires considerable skill, it is practically impossible to secure perfect uniformity of the product, and the tool being made of wood is soon destroyed.

My invention consists in a tool made for this purpose, consisting of a metal plate which is curved transversely to correspond to the outline desired to be given to the glass vessel, so that by holding the tool in contact with the glass vessel and rotating the latter the desired shape will be imparted to it quickly, perfect uniformity will be secured, and the tool, not being liable to be burned, will last for a long time. The advantages of the invention in this regard are very important and will be appreciated by those skilled in the art.

In the use of my invention the glass article is pressed within cylindrical or somewhat flaring sides, and then having been heated while held by a suitable snap it is revolved by the workman on his chair in contact with the finishing-tool 2, as shown in Fig. 2. This tool is a metal plate whose contour is that of the outline of the glass article to be manufactured, and the rotation of the article in contact therewith draws in the sides and brings it to the shape shown in Fig. 2.

The tool may be provided with a suitable handle 3.

I claim—

A glass-finishing tool of metal, consisting of a plate having a surface curved to correspond to the contour of the finished article, and adapted to be held in contact with the outer surface of the article when the latter is rotated, substantially as described.

In testimony whereof I have hereunto set my hand.

JOHN E. MILLER.

Witnesses:
THOMAS W. BAKEWELL,
G. I. HOLDSHIP.